US011868183B2

(12) United States Patent
Iin et al.

(10) Patent No.: US 11,868,183 B2
(45) Date of Patent: Jan. 9, 2024

(54) DISPLAY DEVICE, ELECTRONIC DEVICE AND RETRACTABLE ASSEMBLY

(71) Applicant: WISTRON CORP., New Taipei (TW)

(72) Inventors: Zijie Iin, New Taipei (TW); Yao-Chen Yang, New Taipei (TW); Chia-Jang Chen, New Taipei (TW); Chih Chou Chou, New Taipei (TW)

(73) Assignee: WISTRON CORP., New Taipei (TW)

( * ) Notice: Subject to any disclaimer, the term of this patent is extended or adjusted under 35 U.S.C. 154(b) by 0 days.

(21) Appl. No.: 17/665,631

(22) Filed: Feb. 7, 2022

(65) Prior Publication Data

US 2023/0136093 A1    May 4, 2023

(30) Foreign Application Priority Data

Oct. 28, 2021   (CN) .......................... 202111265541.3

(51) Int. Cl.
   *G06F 1/16*    (2006.01)
(52) U.S. Cl.
   CPC .......... *G06F 1/1652* (2013.01); *G06F 1/1656* (2013.01); *G06F 1/1686* (2013.01)
(58) Field of Classification Search
   CPC ........ H04N 21/4223; H04N 2/57; H04N 2/50; H04N 2/51; G06F 1/1686; G06F 1/1684
   See application file for complete search history.

(56) References Cited

U.S. PATENT DOCUMENTS

| | | | | |
|---|---|---|---|---|
| 6,141,052 A | * | 10/2000 | Fukumitsu | G06F 1/1616 |
| | | | | 348/E5.025 |
| 10,812,698 B1 | * | 10/2020 | Zhou | H04M 1/0264 |
| 10,880,420 B2 | * | 12/2020 | Yang | H04N 23/50 |
| 10,999,518 B1 | * | 5/2021 | Lavallo | H04N 23/51 |
| 11,150,690 B2 | * | 10/2021 | Franke | G06F 1/1607 |
| 11,360,506 B2 | * | 6/2022 | Franke | G06F 1/16 |
| 11,516,405 B2 | * | 11/2022 | Zhang | H04M 1/0264 |
| 2005/0201047 A1 | * | 9/2005 | Krah | G06F 1/1616 |
| | | | | 361/679.55 |
| 2007/0253703 A1 | * | 11/2007 | Tsai | G03B 17/02 |
| | | | | 348/E5.025 |
| 2014/0362284 A1 | * | 12/2014 | Shin | G02B 27/646 |
| | | | | 348/373 |
| 2017/0064166 A1 | * | 3/2017 | Xiong | G03B 11/043 |

(Continued)

FOREIGN PATENT DOCUMENTS

| CN | 113037898 A | 6/2021 |
|---|---|---|
| KR | 20160034748 A | 3/2016 |

OTHER PUBLICATIONS

TW Office Action dated Aug. 23, 2022 in Taiwan application No. 110141765.

(Continued)

*Primary Examiner* — Sagar Shrestha

(74) *Attorney, Agent, or Firm* — McClure, Qualey & Rodack, LLP

(57) ABSTRACT

A retractable assembly includes a fixed frame, a movable frame and a plurality of first balls. The fixed frame has an accommodation portion and a plurality of guiding portions. The guiding portions are connected to the accommodation portion. The movable frame is at least partially located in the accommodation portion. The first balls are movably located in the guiding portions, and the movable frame is connected to the fixed frame via the first balls.

16 Claims, 10 Drawing Sheets

(56) References Cited

U.S. PATENT DOCUMENTS

| | | | |
|---|---|---|---|
| 2018/0224665 A1* | 8/2018 | Im | G02B 7/08 |
| 2019/0137728 A1* | 5/2019 | Wan | H04N 23/54 |
| 2019/0141170 A1* | 5/2019 | Zeng | G06F 1/1624 |
| 2020/0177716 A1* | 6/2020 | Chen | F16M 11/08 |
| 2020/0220955 A1* | 7/2020 | Wang | G06F 1/1675 |
| 2020/0288003 A1* | 9/2020 | Zeng | H04N 23/51 |
| 2021/0318592 A1* | 10/2021 | Kim | H04N 23/57 |
| 2021/0377448 A1* | 12/2021 | Seo | H04N 23/51 |
| 2022/0099909 A1* | 3/2022 | Li | G03B 17/14 |
| 2023/0188823 A1* | 6/2023 | Lee | G03B 5/00 |
| | | | 348/340 |

OTHER PUBLICATIONS

JP Office Action dated Jun. 13, 2023 in Japanese application No. 2022-096202.

* cited by examiner

DISPLAY DEVICE, ELECTRONIC DEVICE AND RETRACTABLE ASSEMBLY

CROSS-REFERENCE TO RELATED APPLICATIONS

This non-provisional application claims priority under 35 U.S.C. § 119(a) on Patent Application No(s). 202111265541.3 filed in China on Oct. 28, 2021, the entire contents of which are hereby incorporated by reference.

TECHNICAL FIELD

This disclosure relates to a display device, an electronic device and a retractable assembly, more particularly to a display device, an electronic device and a retractable assembly having balls.

BACKGROUND

Image display devices, such as LCD monitors or LCD televisions, are becoming more and more common in daily life. When video calls are to be conducted, users may need to install external image capturing units, such as web cameras, on the top of the image display devices. However, the web cameras on the top of the image display devices are not always in use, and the users may be visually interfered by the web cameras when watching videos. In addition, it is unfavorable for the appearance of the image display devices.

Furthermore, due to the pandemic, the demands for video calls or online courses have been increasing. In order for easy connections of expansion devices for consumers, manufacturers may arrange electrical connectors, such as Type-C and HDMI connectors on the front surface of the image display devices. However, the electrical connectors on the front surface of the image display devices may result in visual interferences to the users, and it is unfavorable for the appearance of the image display devices.

SUMMARY

The present disclosure is to provide a display device, an electronic device and a retractable assembly, which are capable of increasing the operation performance and lifespan of the retractable assembly, and providing an aesthetic appearance of the electronic device.

One embodiment of the disclosure provides a retractable assembly including a fixed frame, a movable frame and a plurality of first balls. The fixed frame has an accommodation portion and a plurality of guiding portions. The guiding portions are connected to the accommodation portion. The movable frame is at least partially located in the accommodation portion. The first balls are movably located in the guiding portions, and the movable frame is connected to the fixed frame via the first balls.

One embodiment of the disclosure provides an electronic device including a main body and a retractable assembly. The retractable assembly includes a fixed frame, a movable frame and a plurality of first balls. The fixed frame has an accommodation portion and a plurality of guiding portions. The guiding portions are connected to the accommodation portion. The movable frame is at least partially located in the accommodation portion. The first balls are movably located in the guiding portions, and the movable frame is connected to the fixed frame via the first balls.

One embodiment of the disclosure provides a display device including a device body and a retractable assembly. The retractable assembly includes a fixed frame, a movable frame, a functional component and a plurality of first balls. The fixed frame is fixed in the device body, and the fixed frame has an accommodation portion and a plurality of guiding portions. The guiding portions are connected to the accommodation portion. The movable frame is at least partially located in the accommodation portion. The functional component is fixed to the movable frame, and the functional component is an electrical connector or a web camera. The first balls are movably located in the guiding portions, and the movable frame is connected to the fixed frame via the first balls.

According to the display device, the electronic device and the retractable assembly as described above, since the movable frame is connected to the fixed frame only via balls, the friction between the movable frame and the fixed frame is small, and thus, the lifespan and operation performance of the retractable assembly can be increased.

Furthermore, the functional component can stick out or be retracted into the main body, so that the functional component can be easily utilized when required or hidden when being idle for achieving an aesthetic appearance of the electronic device.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

Aspects and advantages of the invention will become apparent from the following detailed descriptions with the accompanying drawings. For purposes of explanation, one or more specific embodiments are given to provide a thorough understanding of the invention, and which are described in sufficient detail to enable one skilled in the art to practice the described embodiments. It should be understood that the following descriptions are not intended to limit the embodiments to one specific embodiment. On the contrary, it is intended to cover alternatives, modifications, and equivalents as can be included within the spirit and scope of the described embodiments as defined by the appended claims.

Figure 1:
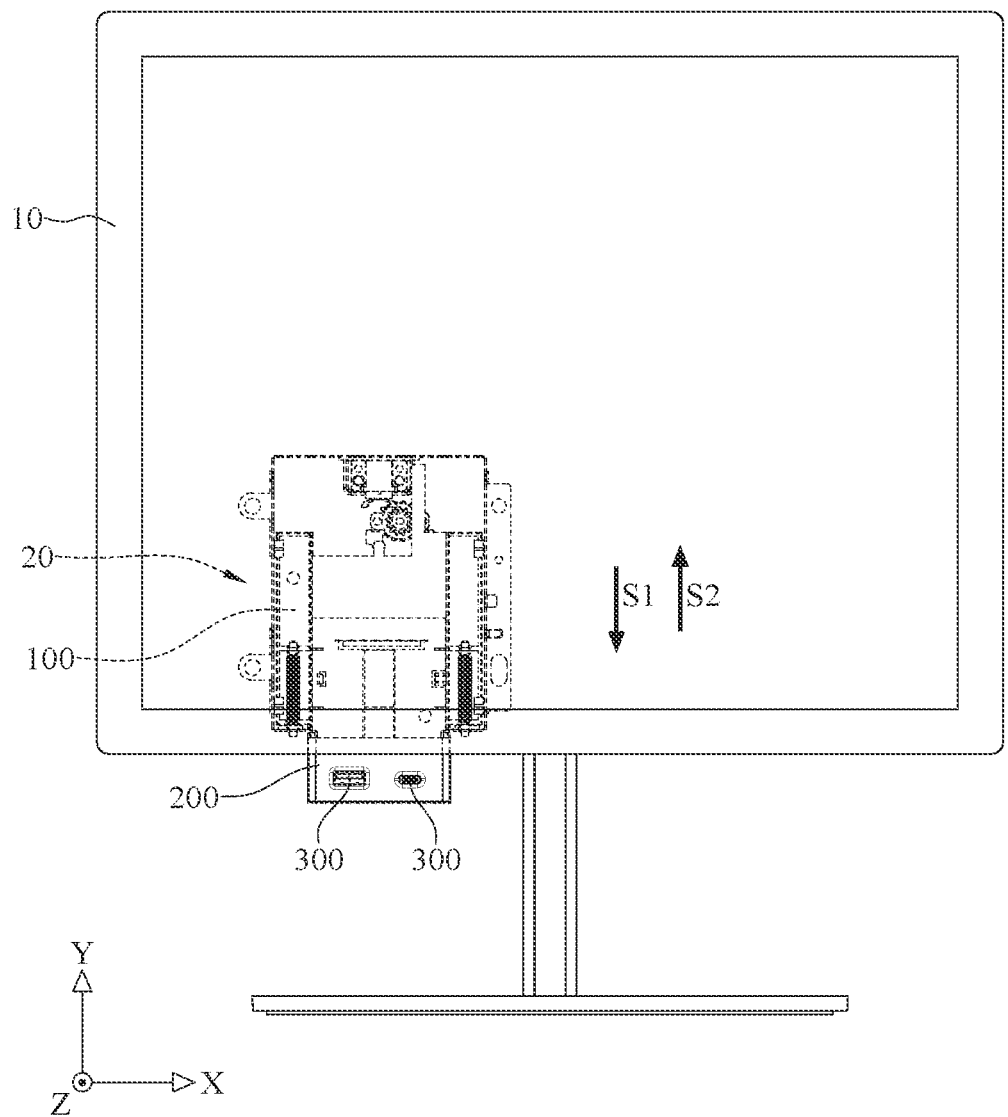
FIG. 1 is a planar view of a functional component sticking out of a main body of an electronic device in accordance with the first embodiment of the present disclosure.
Figure 2:
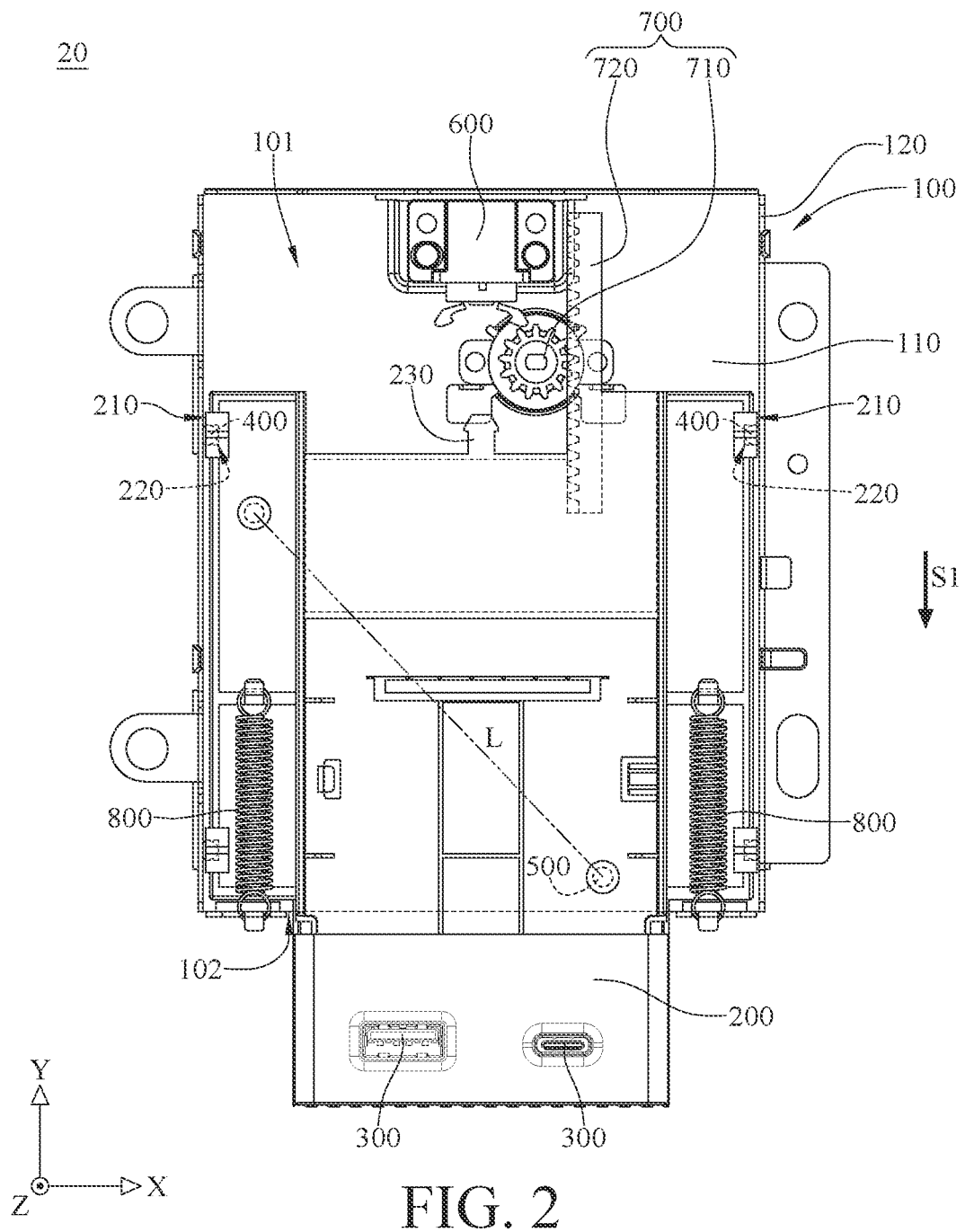
FIG. 2 is a planar view of a retractable assembly in FIG. 1.
Figure 3:
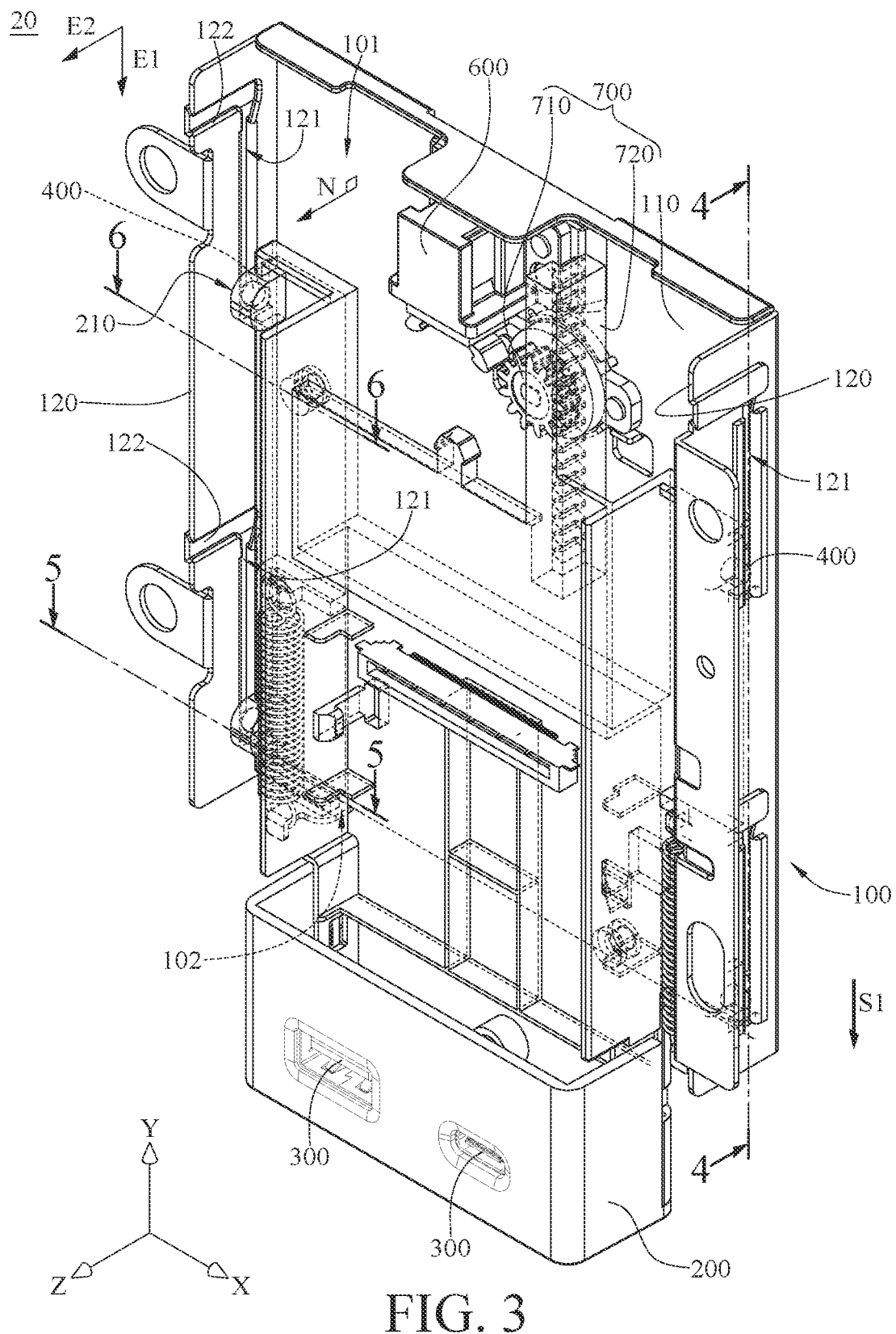
FIG. 3 is a perspective view of the retractable assembly in FIG. 1.
Figure 4:
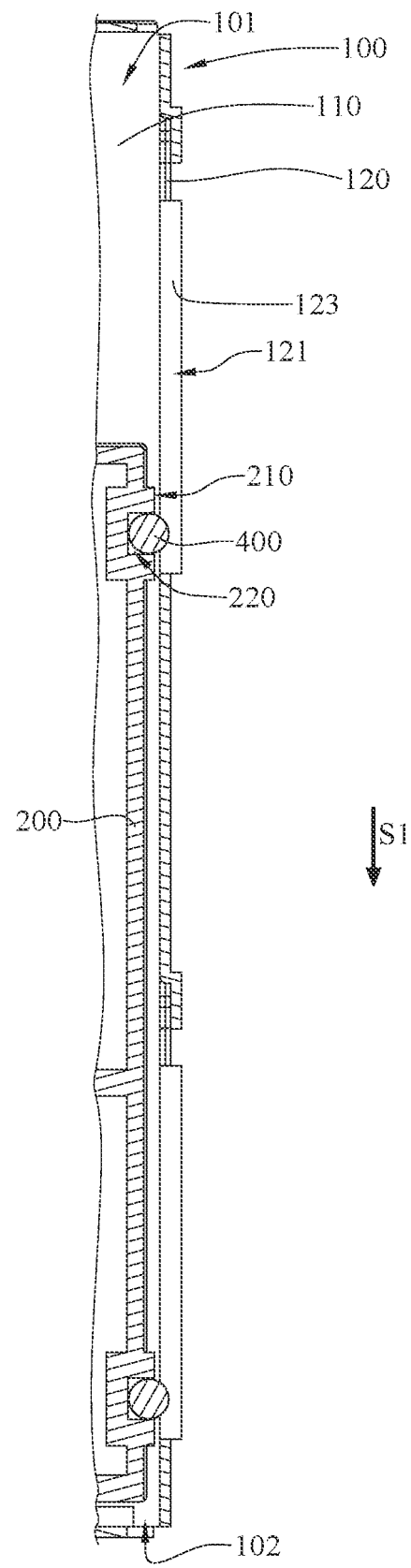
FIG. 4 is a partial cross-sectional view of the retractable assembly taken along line 4-4 in FIG. 3.
Figure 5:
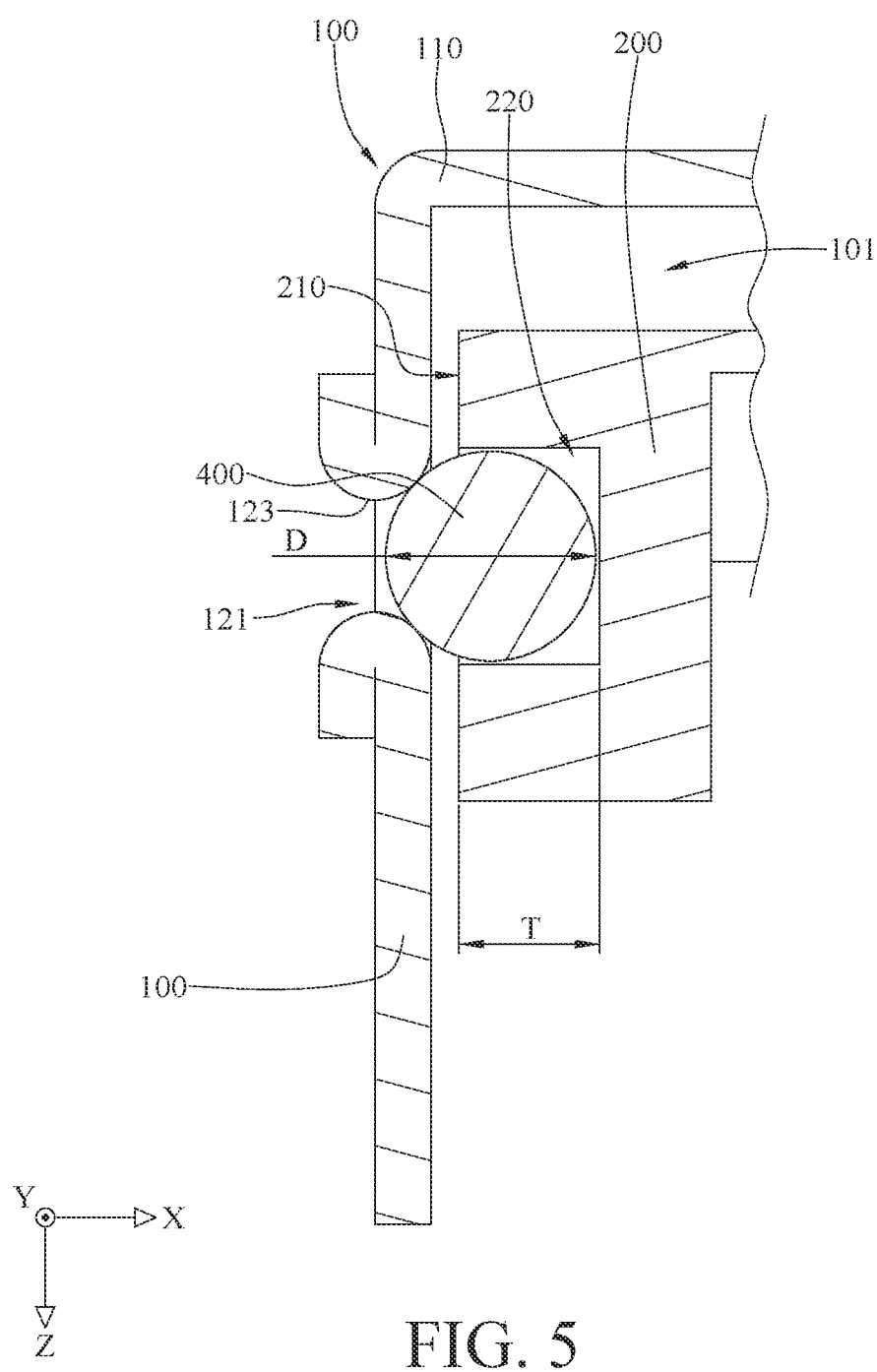
FIG. 5 is a partial cross-sectional view of the retractable assembly taken along line 5-5 in FIG. 3.
Figure 6:
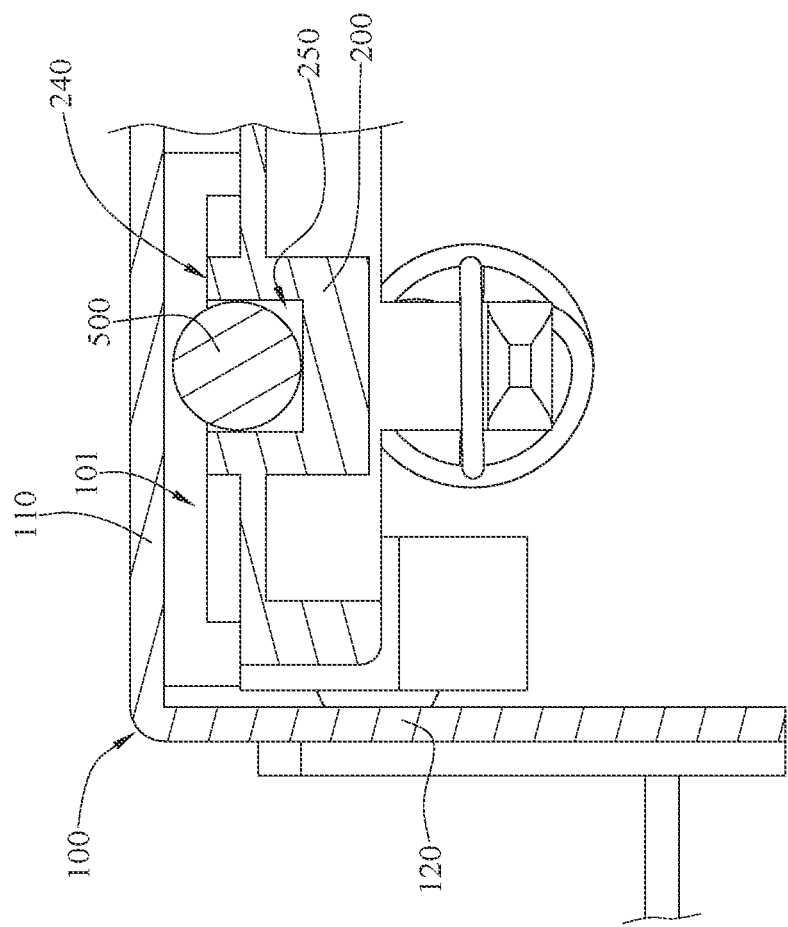
FIG. 6 is a partial cross-sectional view of the retractable assembly taken along line 6-6 in FIG. 3.

Please refer to FIG. 1 to FIG. 6. FIG. 1 is a planar view of a functional component 300 sticking out of a main body 10 of an electronic device 1 in accordance with the first embodiment of the present disclosure, FIG. 2 is a planar view of a retractable assembly 20 in FIG. 1, FIG. 3 is a perspective view of the retractable assembly 20 in FIG. 1, FIG. 4 is a partial cross-sectional view of the retractable assembly 20 taken along line 4-4 in FIG. 3, FIG. 5 is a partial cross-sectional view of the retractable assembly 20 taken along line 5-5 in FIG. 3, and FIG. 6 is a partial cross-sectional view of the retractable assembly 20 taken along line 6-6 in FIG. 3.

As shown in FIG. 1, in this embodiment, the electronic device 1 includes a main body 10 and a retractable assembly 20. The electronic device 1 is, for example, a monitor, but the present disclosure is not limited thereto. In other embodiments, the electronic device may be a smartphone, a notebook computer or a tablet computer. The retractable assembly 20 includes a fixed frame 100, a movable frame 200, a functional component 300 and a plurality of first balls 400.

As shown in FIG. 2 and FIG. 3, the fixed frame 100 is fixed in the main body 10 and has an accommodation portion 101 and an opening portion 102. In detail, the fixed frame 100 includes a bottom plate 110 and two side plates 120. The side plates 120 are respectively connected to two opposite sides of the bottom plate 110, and the bottom plate 110 and the side plates 120 together form the accommodation portion 101 and the opening portion 102. The opening portion 102 is connected to the accommodation portion 101.

Each of the side plates 120 of the fixed frame 100 has a plurality of guiding portions 121 and a plurality of installation portions 122. The guiding portions 121 are located at two opposite sides of the accommodation portion 101 and connected to the accommodation portion 101. An extension direction E1 of each of the guiding portions 121 is substantially perpendicular to a normal line N of a surface of the bottom plate 110 facing the accommodation portion 101. The installation portions 122 are respectively connected to the guiding portions 121, and an extension direction E2 of each of the installation portions 122 is substantially parallel to the normal line N of the surface of the bottom plate 110 facing the accommodation portion 101. In this embodiment, the guiding portions 121 and the installation portions 122 are, for example, grooves, but the present disclosure is not limited thereto. In other embodiments, the guiding portions and the installation portions may be rails.

As shown in FIG. 1 and FIG. 3 to FIG. 6, the movable frame 200 is at least partially located in the accommodation portion 101 along sliding directions S1 and S2 so as to stick out of the accommodation portion 101 from the opening portion 102 or be retracted into the accommodation portion 101 from the opening portion 102. The movable frame 200 has two lateral surfaces 210 and a plurality of first recess portions 220. The two lateral surfaces 210 face away from each other and respectively face the two side plates 120 of the fixed frame 100. The first recess portions 220 are respectively located at the lateral surfaces The functional component 300 is fixed to the movable frame 200, and the functional component 300 is, but not limited to, an electrical connector, such as a Type-C connector or a HDMI connector. In other embodiments, the functional component may be a camera or a device with another function.

The first balls 400 are movably located in the guiding portions 121, and the movable frame 200 is connected to the fixed frame 100 via the first balls 400. In specific, a portion of each of the first balls 400 is located in corresponding one of the first recess portions 220, and another portion of each of the first balls 400 is located in corresponding one of the guiding portions 121. That is, some volume of each first ball 400 is located in corresponding one of the first recess portions 220, and some other volume of the first ball 400 is located in corresponding one of the guiding portions 121.

In this embodiment, a depth T of each of the first recess portions 220 is larger than half of a diameter D of each of the first balls 400, the depth T of each of the first recess portions 220 is smaller or equal to the diameter D of each of the first balls 400. In addition, the first recess portions 220 are provided with a lubricant. The sizes and weights of the balls are small, and the weights of the balls are smaller than the capillary force of the lubricant, so the first balls 400 can be preset in the first recess portions 220 by the capillary force of the lubricant.

In addition, during the installation of the movable frame 200 onto the fixed frame 100, the first balls 400 preset in the first recess portions 220 can slide into the guiding portions 121 from the installation portions 122 for efficiently installing the movable frame 200 at least partially into the accommodation portion 101 of the fixed frame 100.

In this embodiment, the guiding portions 121 of the side plates 120 are formed by, for example, stamping process, and each of the side plates 120 has a fillet structure 123 at edges of the guiding portions 121. The first balls 400 are in contact with the fillet structures 123. As a result, during the movement of the movable frame 200, the fillet structures 123 can reduce the wear of the balls. Note that the fillet structures 123 are optional and may be modified as required. In other embodiments, the side plates may not have a fillet structure at the edges of the guiding portions.

In this embodiment, the movable frame 200 is spaced apart from the bottom plate 110 of the fixed frame 100. In this embodiment, the retractable assembly 20 may further include two second balls 500. The movable frame 200 has a bottom surface 240 and two second recess portions 250. The bottom surface 240 faces the bottom plate 110 of the fixed frame 100, and the second recess portions 250 are located at the bottom surface 240. Similar to the way of disposing the first balls in the first recess portions 220, the second recess portions 250 may be provided with a lubricant, so that the second balls can be preset in the second recess portions 250 by the capillary force of the lubricant.

The second balls 500 are located in the second recess portions 250, and the movable frame 200 is connected to the bottom plate 110 of the fixed frame 100 via the second balls 500. As such, when the second balls 500 are connected to the bottom plate 110 of the fixed frame 100, the second balls 500 can be served as supports for the movable frame 200 in a Z direction. For example, when the first balls 400 are not worn off yet or slightly worn off, the second balls 500 are not connected to the bottom plate 110 of the fixed frame 100 yet. When the first balls 400 are worn to a certain degree, the second balls 500 are connected to the bottom plate 110 of the fixed frame 100.

As shown in FIG. 2, in this embodiment, a connection line L between the two second balls 500 is not parallel to the sliding direction S1. That is, with respect to the movable frame 200, the two second balls 500 are arranged diagonally, but the present disclosure is not limited thereto. In other embodiments, the connection line between the two second balls may be parallel to the sliding direction S1.

In this embodiment, the fixed frame 100 is connected to the movable frame 200 only via the first balls 400 and the second balls 500, so that the movement of the movable frame 200 relative to the fixed frame 100 can be smoother. Furthermore, since the wear of the balls is mild during the movement of the movable frame 200, the lifespan and operation performance of the retractable assembly 20 can be improved. Furthermore, owing to the low cost of the balls, the market competitiveness of the retractable assembly 20 can be increased.

Note that the quantity of the second balls 500 is not restricted in the disclosure and may be modified as required. In other embodiments, the quantity of the second ball may be one or more than three. In another embodiment, the retractable assembly may not include the second balls, and the movable frame may be suspended above the bottom plate by other suitable arrangements or structures.

In this embodiment, the retractable assembly 20 may further include a push-push mechanism 600. The push-push mechanism 600 is fixed to the bottom plate 110 of the fixed frame 100. The movable frame 200 has an engagement part 230. Users may press the movable frame 200 so as to engage the engagement part 230 with the push-push mechanism 600 or disengage the engagement part 230 from the push-push mechanism 600. Note that the retractable assembly 20 is not restricted to including the push-push mechanism 600 in the disclosure. In other embodiments, the retractable assembly may not include the push-push mechanism 600, and the movable frame is maintained in positions with respect to the fixed frame by other suitable means.

In this embodiment, the retractable assembly 20 may further include a guiding assembly 700. The guiding assembly 700 includes a pinion 710 and a rack 720. The pinion 710 is rotatably disposed on the bottom plate 110 of the fixed frame 100, the rack 720 is disposed on the movable frame 200. The rack 720 is engaged with the pinion 710, and the guiding assembly 700 is configured to guide the movable frame 200 to move relative to the fixed frame 100.

Note that the guiding assembly 700 of the retractable assembly 20 is optional, and the guiding assembly 700 may be omitted in another embodiment.

In this embodiment, the retractable assembly 20 may further include two elastic components 800. The elastic components 800 are, for example, extension springs, and two opposite ends of each of the elastic components 800 are respectively connected to the fixed frame 100 and the movable frame 200, so when the engagement part 230 is disengaged from the push-push mechanism 600, the elastic components 800 force the movable frame 200 to stick out of the fixed frame 100 through the opening portion 102.

In this embodiment, the quantity of the elastic components 800 is two, but the present disclosure is not limited thereto. In other embodiments, the quantity of the elastic component may be one, or the elastic component may be omitted.

Figure 7:
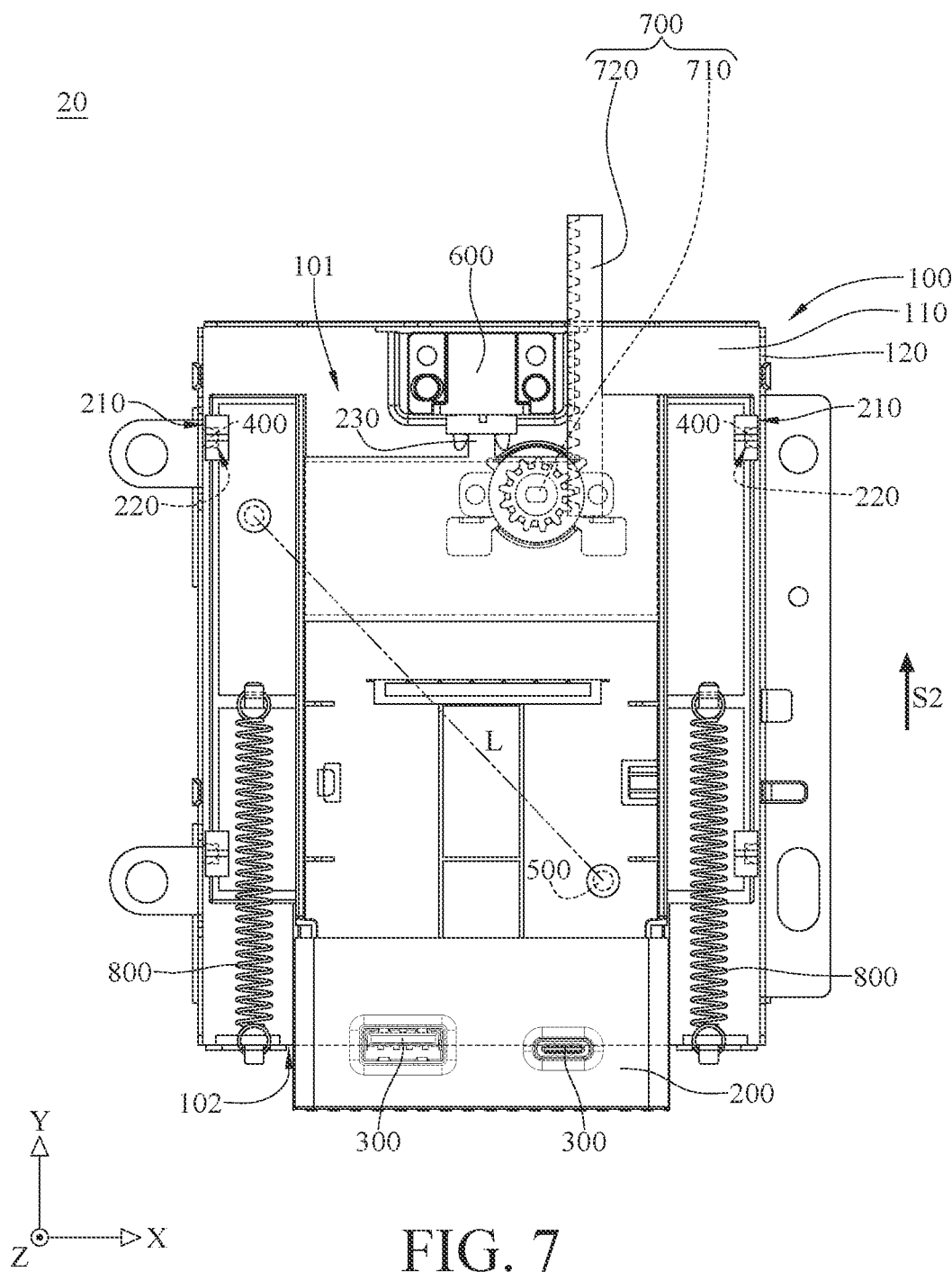
FIG. 7 is a planar view of the functional component retracted into the fixed frame of the retractable assembly in FIG. 2.
Figure 8:
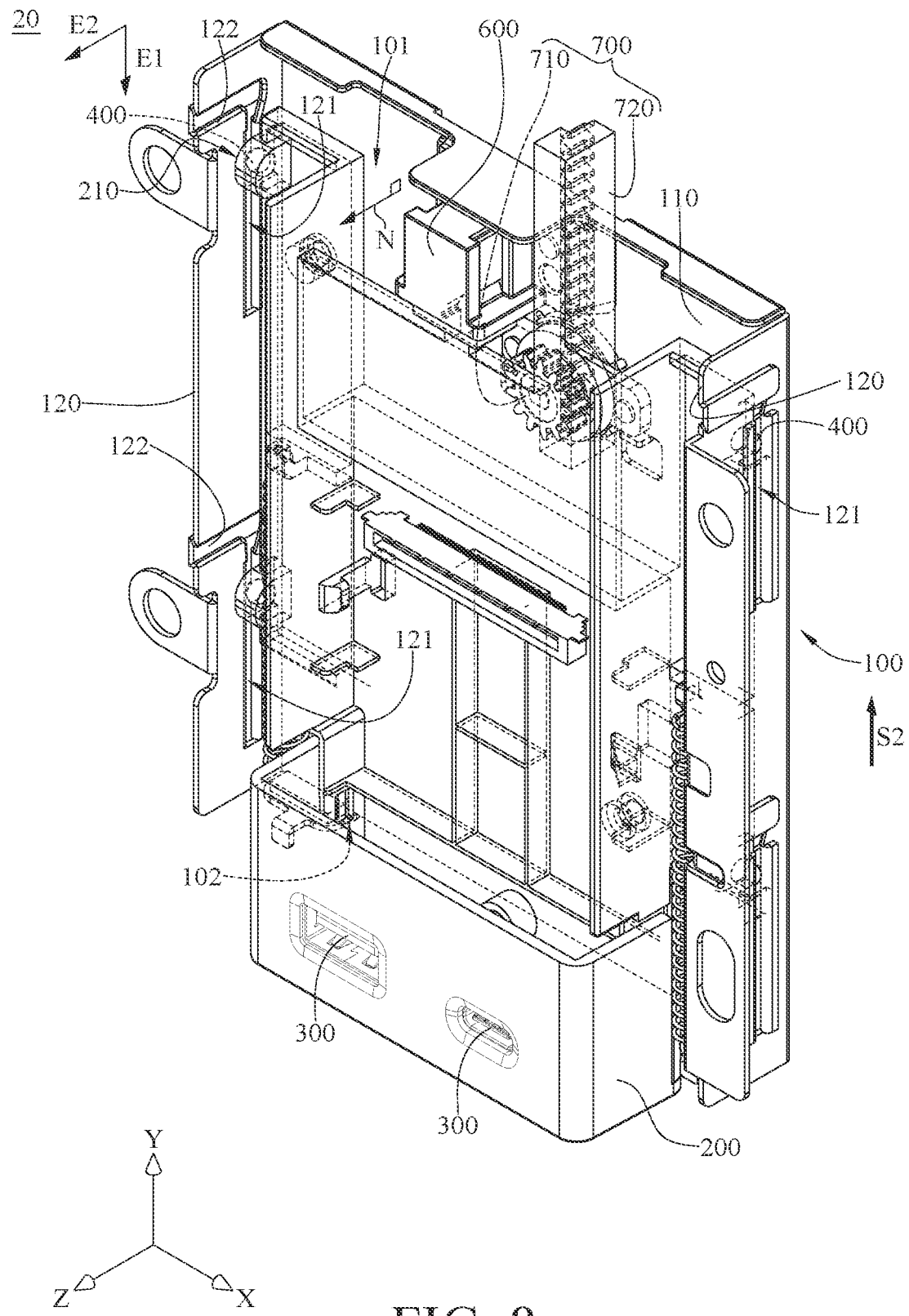
FIG. 8 is a perspective view of the retractable assembly in FIG. 7.
Figure 9:
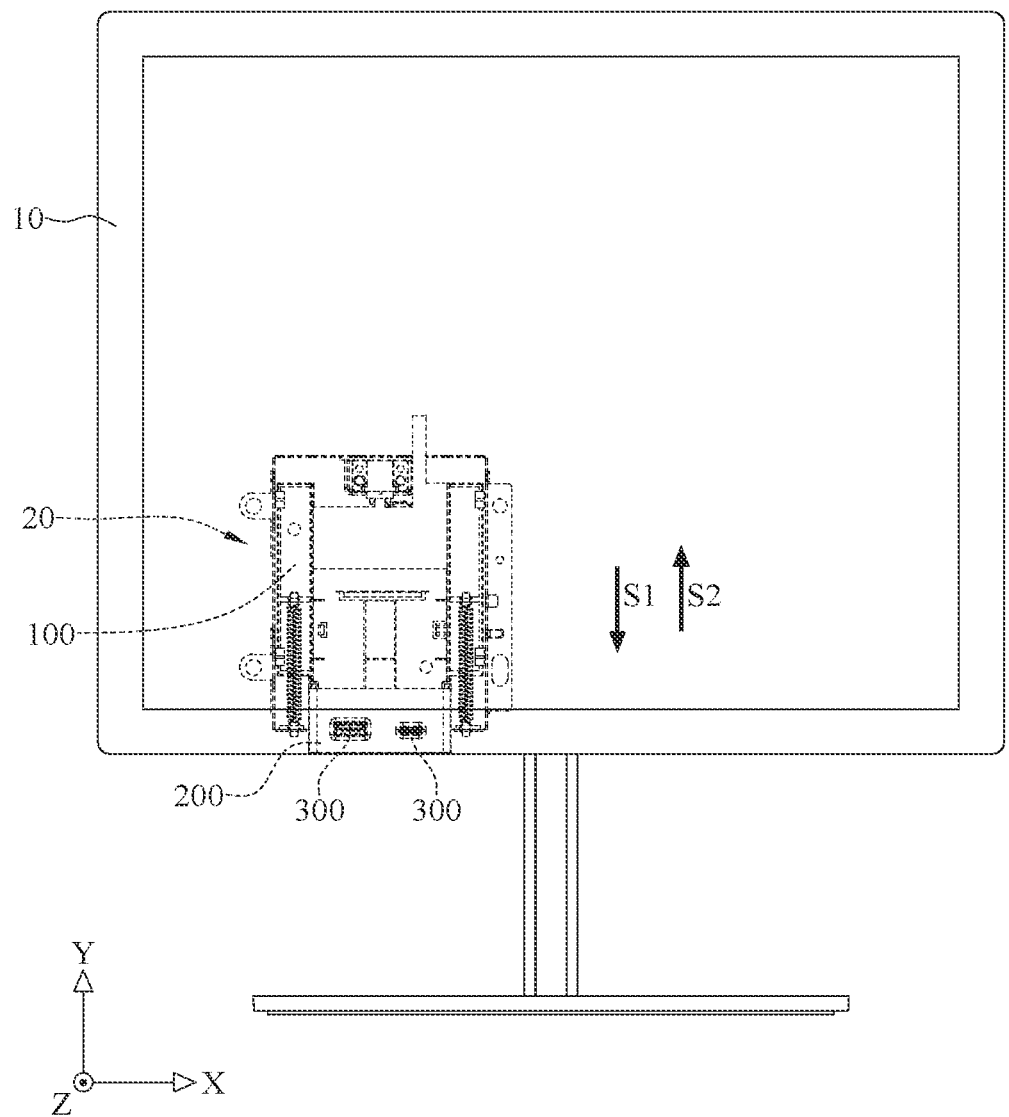
FIG. 9 is a planar view of the functional component retracted into the main body of the electronic device in FIG. 1.

Please refer to FIG. 1 to FIG. 3 and FIG. 7 to FIG. 9. FIG. 7 is a planar view of the functional component 300 retracted into the fixed frame 100 of the retractable assembly 20 in FIG. 2, FIG. 8 is a perspective view of the retractable assembly 20 in FIG. 7, and FIG. 9 is a planar view of the functional component 300 retracted into the main body 10 of the electronic device 1 in FIG. 1.

As shown in FIG. 1 to FIG. 3, when a user would like to use the functional component 300, the user may press the movable frame 200 at the bottom of the main body 10 so as to disengage the engagement part 230 of the movable frame 200 from the push-push mechanism 600, such that the elastic force of the elastic components 800 forces the movable frame 200 and the functional component 300 to stick out of the main body 10 along the sliding direction S 1. By doing so, the user may connect cables to the functional component 300 directly in front of the main body 10.

Since the movable frame 200 is connected to the fixed frame 100 only via the balls, the friction between the movable frame 200 and the fixed frame 100 is small, and thus, the lifespan and operation performance of the retractable assembly 20 can be increased.

As shown in FIG. 7 to FIG. 9, when the functional component 300 is not used, the user may press the movable frame 200 at the bottom of the main body 10 again so as to push the movable frame 200 and the functional component 300 back into the main body 10 along sliding direction S2 until the engagement part 230 of the movable frame 200 is engaged with the push-push mechanism 600. By doing so, the movable frame 200 and the functional component 300 are fastened and hidden in the main body 10 so as to provide an aesthetic appearance of the electronic device 1.

Figure 10:
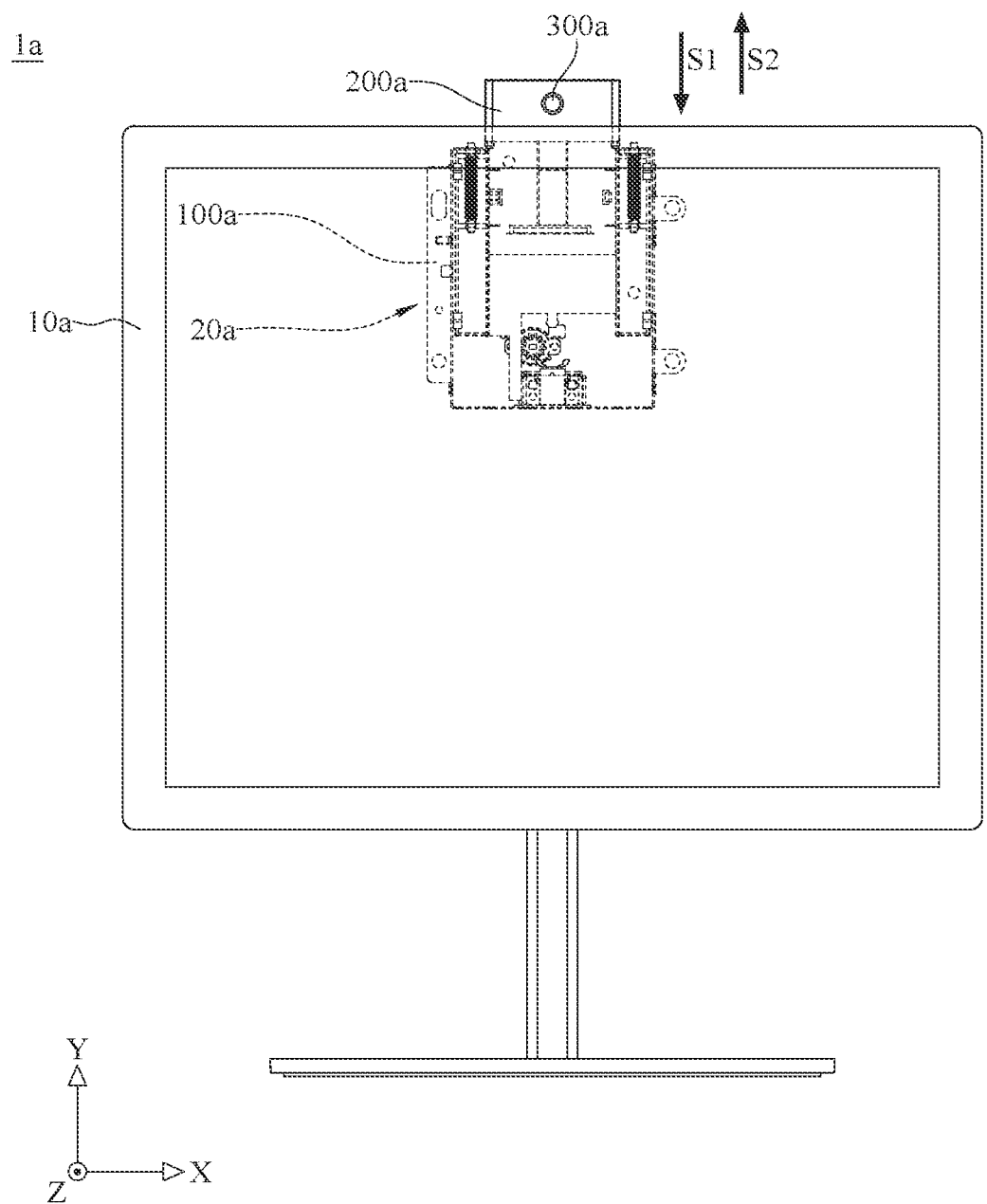
FIG. 10 is a planar view of an image capturing unit sticking out of a device body of a display device in accordance with the second embodiment of the present disclosure.

Please refer to FIG. 3 and FIG. 10. FIG. 10 is a planar view of an image capturing unit 300a sticking out of a device body l0a of a display device la in accordance with the second embodiment of the present disclosure.

In this embodiment, the display device la includes the device body l0a and a web camera 20a. The device body l0a is, for example, a monitor of a desktop computer. The web camera 20a is, for example, disposed at the middle and top of the device body l0a. The web camera 20a includes a fixed frame 100a, a movable frame 200a, an image capturing unit 300a and a plurality of first balls (e.g., the first balls 400 in FIG. 3). The fixed frame 100a is fixed in the device body l0a and has an accommodation portion (e.g., the accommodation portion 101 in FIG. 3) and a plurality of guiding portions (e.g., the guiding portions 121 in FIG. 3). The guiding portions (e.g., the guiding portions 121 in FIG. 3) are connected to the accommodation portion (e.g., the accommodation portion 101 in FIG. 3). The movable frame 200a is at least partially located in the accommodation portion. The image capturing unit 300a is fixed to the movable frame 200a, and the image capturing unit 300a is configured to take photos or record images. The first balls (e.g., the first balls 400 in FIG. 3) are movably located in the guiding portions (e.g., the guiding portions 121 in FIG. 3), and the movable frame 200a is connected to the fixed frame 100a via the first balls (e.g., the guiding portions 121 in FIG. 3). That is, the movable frame 200a can move the image capturing unit 300a along sliding direction S1 and S2, so that the image capturing unit 300a can stick out or be retracted into the fixed frame 100a.

According to the display device, the electronic device and the retractable assembly as described above, since the movable frame is connected to the fixed frame only via balls, the friction between the movable frame and the fixed frame is small, and thus, the lifespan and operation performance of the retractable assembly can be increased.

Furthermore, the functional component, such as a web camera or an electrical connector, can stick out or be retracted into the main body, so that the functional component can be easily utilized when required or hidden when being idle for achieving an aesthetic appearance of the electronic device.

The embodiments were chosen and described in order to best explain the principles of the disclosure and its practical applications, to thereby enable others skilled in the art to best utilize the disclosure and various embodiments with various modifications as are suited to the particular use contemplated. It is intended that the scope of the disclosure be defined by the following claims and their equivalents.

What is claimed is:

1. A retractable assembly comprising:
a fixed frame having an accommodation portion and a plurality of guiding portions, wherein the plurality of guiding portions are connected to the accommodation portion;
a movable frame at least partially located in the accommodation portion; and
a plurality of first balls movably located in the plurality of guiding portions, wherein the movable frame is connected to the fixed frame only via the plurality of first balls;
wherein the fixed frame has an opening portion, the fixed frame comprises a bottom plate and two side plates, the two side plates are respectively connected to two opposite sides of the bottom plate, the bottom plate and the two side plates together form the accommodation portion and the opening portion, the plurality of guiding portions are respectively located at the two side plates, the movable frame has two lateral surfaces and a plurality of first recess portions, the two lateral surfaces face away from each other, the plurality of first recess portions are respectively located at the two lateral surfaces, a portion of each of the plurality of first balls is located in corresponding one of the plurality of first recess portions, another portion of each of the plurality of first balls is located in corresponding one of the plurality of guiding portions, and the movable frame can be moved relative to the fixed frame so as to stick out of the fixed frame through the opening portion.

2. The retractable assembly according to claim 1, wherein each of the two side plates of the fixed frame has a fillet structure at edges of the plurality of guiding portions, and the plurality of first balls are in contact with the fillet structures.

3. The retractable assembly according to claim 1, wherein a depth of each of the plurality of first recess portions is larger than half of a diameter of each of the plurality of first balls, and the depth of each of the plurality of first recess portions is smaller or equal to the diameter of each of the plurality of first balls.

4. The retractable assembly according to claim 1, wherein the plurality of first recess portions are provided with a lubricant.

5. The retractable assembly according to claim 1, wherein the plurality of guiding portions of the two side plates are formed by stamping process.

6. The retractable assembly according to claim 1, wherein the movable frame is spaced apart from the bottom plate of the fixed frame.

7. The retractable assembly according to claim 1, wherein each of the two side plates has a plurality of installation portions respectively connected to the plurality of guiding portions, and the plurality of first balls are slidable from the plurality of installation portions into the plurality of guiding portions.

8. The retractable assembly according to claim 7, wherein an extension direction of each of the plurality of installation portions is parallel to a normal line of a surface of the bottom plate facing the accommodation portion.

9. The retractable assembly according to claim 1, further comprising at least one second ball, wherein the movable frame has a bottom surface and at least one second recess portion, the bottom surface faces the bottom plate of the fixed frame, the at least one second recess portion is located at the bottom surface, the at least one second ball is located in the at least one second recess portion, and the at least one second ball is connected to or not connected to the bottom plate of the fixed frame.

10. The retractable assembly according to claim 1, further comprising a push-push mechanism fixed to the bottom plate of the fixed frame, wherein the movable frame has an engagement part configured to be engaged with or disengaged from the push-push mechanism.

11. An electronic device comprising:
a main body; and
a retractable assembly comprising:
a fixed frame fixed in the main body, wherein the fixed frame has an accommodation portion and a plurality of guiding portions connected to the accommodation portion;
a movable frame at least partially located in the accommodation portion;
a functional component fixed to the movable frame; and
a plurality of first balls movably located in the plurality of guiding portions, wherein the movable frame is connected to the fixed frame only via the plurality of first balls;
wherein the fixed frame has an opening portion, the fixed frame comprises a bottom plate and two side plates, the two side plates are respectively connected to two opposite sides of the bottom plate, the bottom plate and the two side plates together form the accommodation portion and the opening portion, the plurality of guiding portions are respectively located at the two side plates, the movable frame has two lateral surfaces and a plurality of first recess portions, the two lateral surfaces face away from each other, the plurality of first recess portions are respectively located at the two lateral surfaces, a portion of each of the plurality of first balls is located in corresponding one of the plurality of first recess portions, another portion of each of the plurality of first balls is located in corresponding one of the plurality of guiding portions, and the movable frame can be moved relative to the fixed frame so as to stick out of the fixed frame through the opening portion.

12. The electronic device of claim 11, wherein each of the two side plates of the fixed frame has a fillet structure at edges of the plurality of guiding portions, and the plurality of first balls are in contact with the fillet structures.

13. The electronic device of claim 11, wherein a depth of each of the plurality of first recess portions is larger than half of a diameter of each of the plurality of first balls, and the depth of each of the plurality of first recess portions is smaller or equal to the diameter of each of the plurality of first balls.

14. The electronic device of claim 11, further comprising at least one second ball, wherein the movable frame has a bottom surface and at least one second recess portion, the bottom surface faces the bottom plate of the fixed frame, the at least one second recess portion is located at the bottom surface, the at least one second ball is located in the at least one second recess portion, and the at least one second ball is connected to or not connected to the bottom plate of the fixed frame.

15. The electronic device of claim 11, wherein the functional component is an electrical connector or a web camera.

16. A display device comprising:
a device body; and
a retractable assembly comprising:
a fixed frame fixed in the device body, wherein the fixed frame has an accommodation portion and a plurality of guiding portions connected to the accommodation portion;

a movable frame at least partially located in the accommodation portion;
a functional component fixed to the movable frame, wherein the functional component is an electrical connector or a web camera; and
a plurality of first balls movably located in the plurality of guiding portions, wherein the movable frame is connected to the fixed frame only via the plurality of first balls;
wherein the fixed frame has an opening portion, the fixed frame comprises a bottom plate and two side plates, the two side plates are respectively connected to two opposite sides of the bottom plate, the bottom plate and the two side plates together form the accommodation portion and the opening portion, the plurality of guiding portions are respectively located at the two side plates, the movable frame has two lateral surfaces and a plurality of first recess portions, the two lateral surfaces face away from each other, the plurality of first recess portions are respectively located at the two lateral surfaces, a portion of each of the plurality of first balls is located in corresponding one of the plurality of first recess portions, another portion of each of the plurality of first balls is located in corresponding one of the plurality of guiding portions, and the movable frame can be moved relative to the fixed frame so as to stick out of the fixed frame through the opening portion.

* * * * *